United States Patent [19]

Reidy

[11] Patent Number: 5,203,989

[45] Date of Patent: * Apr. 20, 1993

[54] POTABLE AIR-WATER GENERATOR

[76] Inventor: James J. Reidy, 1260 Main St., Holden, Mass. 01520

[*] Notice: The portion of the term of this patent subsequent to Apr. 21, 2009 has been disclaimed.

[21] Appl. No.: 828,190

[22] Filed: Jan. 30, 1992

Related U.S. Application Data

[63] Continuation-in-part of Ser. No. 648,541, Jan. 30, 1991, Pat. No. 5,149,446, and a continuation-in-part of Ser. No. 749,932, Aug. 16, 1991, Pat. No. 5,106,512.

[51] Int. Cl.$^5$ .......... B01D 21/30; C02F 1/00; F25D 17/06

[52] U.S. Cl. .......... 210/137; 210/149; 210/251; 210/258; 55/213; 55/215; 55/217; 55/269; 55/279; 62/93; 62/272

[58] Field of Search ............ 55/20, 21, 23, 80, 97, 55/213, 215, 217, 267, 269, 279, 322, 472, 126; 62/93, 272; 210/104, 128, 137, 149, 251, 258, 741, 742, 744, 748, 806, 140, 257.1

[56] References Cited

U.S. PATENT DOCUMENTS

| | | | |
|---|---|---|---|
| 3,575,009 | 4/1971 | Kooney | 62/272 |
| 4,182,132 | 1/1980 | Nasser et al. | 62/93 |
| 4,351,651 | 9/1982 | Courneya | 62/93 X |
| 5,068,030 | 11/1991 | Chen | 210/748 X |

Primary Examiner—Charles Hart
Attorney, Agent, or Firm—Iandiorio & Dingman

[57] ABSTRACT

A water generating device for obtaining portable water from ambient air inside or outside a structure or dwelling. There is an air filter for filtering the air prior to processing of the air. The air filter may include a one-time sensing element which renders it unusable when removed from the generator. A condenser is provided for extracting water vapor in the air. Between the condenser and the collection point, there is an immediate temporary holding reservoir, or plumbing to this reservoir, which contains an ultraviolet light to kill existing microorganisms, as well as a pump to transport the water through a subsequent water filter, a second exposure to ultraviolet light, and ultimately, at the final discharge point to the internal or external water storage unit there may be another ultraviolet light that creates a sterile outlet from the primary system. The water filter may also include a one-time sensing element which renders it unusable when removed. A switch may be provided for automatically deactivating the device until the nonreusable or cleanable air filter element is replaced or cleaned. A timer or flow meter may be provided for deactivating the device until the water filter element is replaced after a predetermined number of hours or water volume of operation. A sensor may be provided for deactivating the device when the UV light(s) fail to operate.

31 Claims, 6 Drawing Sheets

POTABLE AIR-WATER GENERATOR

RELATED APPLICATION

This application is a continuation-in-part of application Ser. No. 07/648,541, filed on Jan. 30, 1991, U.S. Pat. No. 5,149,446 and of Ser. No. 07/745,932, filed on Aug. 16, 1991, U.S. Pat. No. 5,106,512.

FIELD OF INVENTION

The present invention relates to water making apparatus, and, more particularly, to such a device which makes potable water from the air.

BACKGROUND OF INVENTION

In recent years, it is becoming more usual for people in offices, industry and in the home to drink bottled water rather than the water from a water tap. Countless other situations exist where water is difficult to obtain or where available water or water quality leaves much to be desired. In many cases this also creates a need to carry and lift heavy containers of water periodically and to transport the water from the place where it was acquired to the place where it will be used. Accordingly, there have been some attempts to provide water generating devices to alleviate these problems.

U.S. Pat. No. 1,931,347 to Gay issued Oct. 17, 1933, prepares potable water from a supply of water which is first frozen, to remove impurities. It does not treat water without first freezing it.

U.S. Pat. No. 2,409,624 to Granville issued Oct. 22, 1946, is a complicated system for providing water. It is manually powered and uses the "sulfuric acid system".

U.S. Pat. No. 3,035,418 to Wright issued May 22, 1962, provides water from air, but is lacking in many of the features needed to produce potable water for modern day uses. There is no safety provision allowing only properly operable filters to be used, and no provision to allow water production only when certain temperature/humidity conditions can be met.

U.S. Pat. No. 3,575,009 to Kooney issued Apr. 13, 1971, provides water vapor condensing means for use with a laundry clothes dryer. It uses ice as coolant and uses a filtering material designed to remove only lint from the resulting condensed water. The condensed water vapor is claimed to be suitable for use in steam irons or for any "other" purpose requiring water. There are no provisions for obtaining water of any confident purity level from the ambient air. Also, it has no air filter, has only a coarse water filter, no operational controls except the manually supplied ice filled chill unit, and it can only work during the time that a clothes dryer is operating.

U.S. Pat. No. 3,675,442 to Swanson issued Jul. 11, 1972, discloses an apparatus for recovering potable water from "humid" air. It is thus not designed to operate at varying humidity levels, and fresh water is used as a coolant with water pumps. It has no air or water filters and no refined controls. It diverts condensed water vapor to the cool water bath as needed, and only the overflow is channeled to another container and is called potable. Swanson does not use a fan or blower to move air through his unit.

U S. Pat. No. 4,182,132 to Nasser et al. issued Jan. 8, 1980, is designed to operate in hot and humid regions only; its primary purpose is to cool and dehumidify ambient air in relatively large areas such as a city neighborhood. There is no provision for protecting the purity of the water. It must be taller than the tallest building in the area, requires a foundation recessed in the ground, cannot be in any enclosing structure and must be in an open area free of ground contours, needs at least two air passages, and a heat dissipator in a passageway separate from the passageway containing the air cooler and moisture condenser. It relies on the specific gravity of cold air sinking within the device and hot air rising within the device. It has no air or water filters to protect the water.

U.S. Pat. No. 4,255,937 to Erlich issued Mar. 17, 1981, provides no operational controls for humidity, temperature, or filter conditions. The device also does not use a blower or fan.

U.S. Pat. No. 4,433,552 to Smith issued Feb. 28, 1984, does not mention potable water, has no air or water filters, requires a turbine, a generator, and wind. It has to be large (for example, it may be mounted on a trailer), it cannot be used indoors, there is no provision for protection of the water quality, and no filters for keeping insects, dust, etc. out of the water.

U.S. Pat. No. 4,892,570 to Littrell issued Jan. 9, 1990, is for agricultural water, and it only operates outdoors, is very large, designed for only high temperature regions, requires a wind of at least 5 mph to operate, is made of stone and cinder blocks, and has no refined controls or filters.

SUMMARY OF THE INVENTION

The present invention provides a potable water generator designed to produce potable water using existing technologies and known devices in a unique combination that safely extracts potable water from the ambient air in a wide range of user definable temperature and humidity conditions.

This invention provides a fine functional air filter to remove impurities from the air, safely, because the potable water generator can be arranged to assure that only fresh and properly functioning air filters are used. User neglect or abuse can be avoided, thereby contributing to safe, pure water. This unit can be made to not work with a malfunctioning or inefficient air filter.

This invention provides a fine functional water filter to remove impurities, odors, and objectionable taste, as well as other contaminants, safely. The generator may be programmed with a time or flow meter to remind, or force the user to use only fresh and properly functioning water filters and that the water filter is replaced on a regular, timely basis. Each time a water filter is replaced, the optional timer or flow meter may be automatically reset to zero. User neglect or abuse is avoidable, thereby further contributing to safe, pure water. This unit can be designed to not work with a water filter exceeding the time or flow meter limits.

Concerning the air filters, these are replaced or cleaned when needed based upon a sensed pressure drop, such as with a pressure differential indicator. When the pressure drop reaches a predetermined amount, the generator can be made to cease operation until the air filter is replaced or cleaned to assure that only fresh and properly functioning, energy efficient, air filters are used and replaced or cleaned on a regular, timely basis. User neglect or abuse is avoided, thereby further contributing to safe, pure water. This unit can be designed to not work with an air filter exceeding the pressure differential limits. A sensor can be included to assure that an air filter, in fact, is in place.

The frames of either or both filters may contain a cooperating female sensor, which cooperates with a male pin on an electric switch that deactivates the operation of the entire unit or just the condensing function. When either filter is removed for required replacement or cleaning this original cooperating female sensor can be destroyed and/or made irreparable. Then only new, or cleaned, and safe filters having such sensing structure could be used.

A time or flow meter for the water filter and a pressure sensing device for the air filter, as applicable, can be programmed to deactivate the entire unit or just the condensing function until the filter or filters required to be replaced or cleaned are in fact replaced or cleaned. A sensing device can be added to confirm that the appropriate replacement filter or filters have been properly reinstalled and enable the generator to operate once again. The time span or water volume, hence the filter life, can be determined by the particular model, its intended use and location—such as residential, industrial, commercial, construction, marine, recreational, military, and the like.

Safety and water purity is further enhanced by exposing the condensed water vapor to ultraviolet light on at least one occasion before this water is available to the user. On each single occasion over 99.99% of all bacteria, virus, and algae exposed to this ultraviolet light will be killed. The first exposure to ultraviolet light can be accomplished as close to the newly condensed water vapor as possible—either in the initial catch basin or drip pan, or in plumbing to, or inside a sump-pump temporary holding reservoir. A second exposure to ultraviolet light can be accomplished after the water filter and before the condensed water vapor exits the device into the removable water container or exterior storage devices as chosen by the user. This second exposure to ultraviolet light will also kill at least 99.99% of all algae, virus, or bacteria that may have reached this point. A double exposure to ultraviolet light can be done with two individual ultraviolet lights or by plumbing the water past one ultraviolet light twice.

A pump is used to enable the passage of the water through a fine water filter and to aid in transporting the water to subsequent locations within the device and/or to exterior storage units.

For those users sensitive to, or conscientious of, energy consumption, the generator can include temperature and humidity gauges and/or a thermostat and humidistat. These devices could be used as follows:

The temperature and humidity gauges would aid the experienced user, as well as the novice in conjunction with an optional quick reference chart provided with the unit, in determining whether or not they want to operate the unit under present conditions for the likely water yield at that time.

A thermostat and humidistat setting as determined by the user, would allow unattended operation and preclude the need for any user monitoring whatsoever. The user could choose settings that provide only maximum water yield for energy consumed, or those settings that produce water regardless of energy consumed, or the user could choose one of the infinite settings between these two extremes.

It is expected that needs and priorities within an individual's environment are not static and that the flexibility afforded by these items would maximize the functionality and efficiency of the generator.

A custom designed reusable water condensate container could also be an integral safety feature of the generator. It is conceivable that human nature or dire need may prompt the reuse of any container not designed for such purpose and may therefore be unsanitary and even dangerous. All containers in all models of the generator may be designed to allow easy and proper cleaning by internal access through a wide neck. In addition, all larger containers may have an optional spigot. Those containers without spigots will transport more safely than those having spigots. Preferably, there is an ultraviolet light at the point the water enters the container to prevent organisms from entering the system through the exit point.

Other objects, features, and advantages will be apparent from the following detailed description of preferred embodiments taken in conjunction with the accompanying drawings in which:

DETAILED DESCRIPTION OF THE PREFERRED EMBODIMENTS

Figure 1:
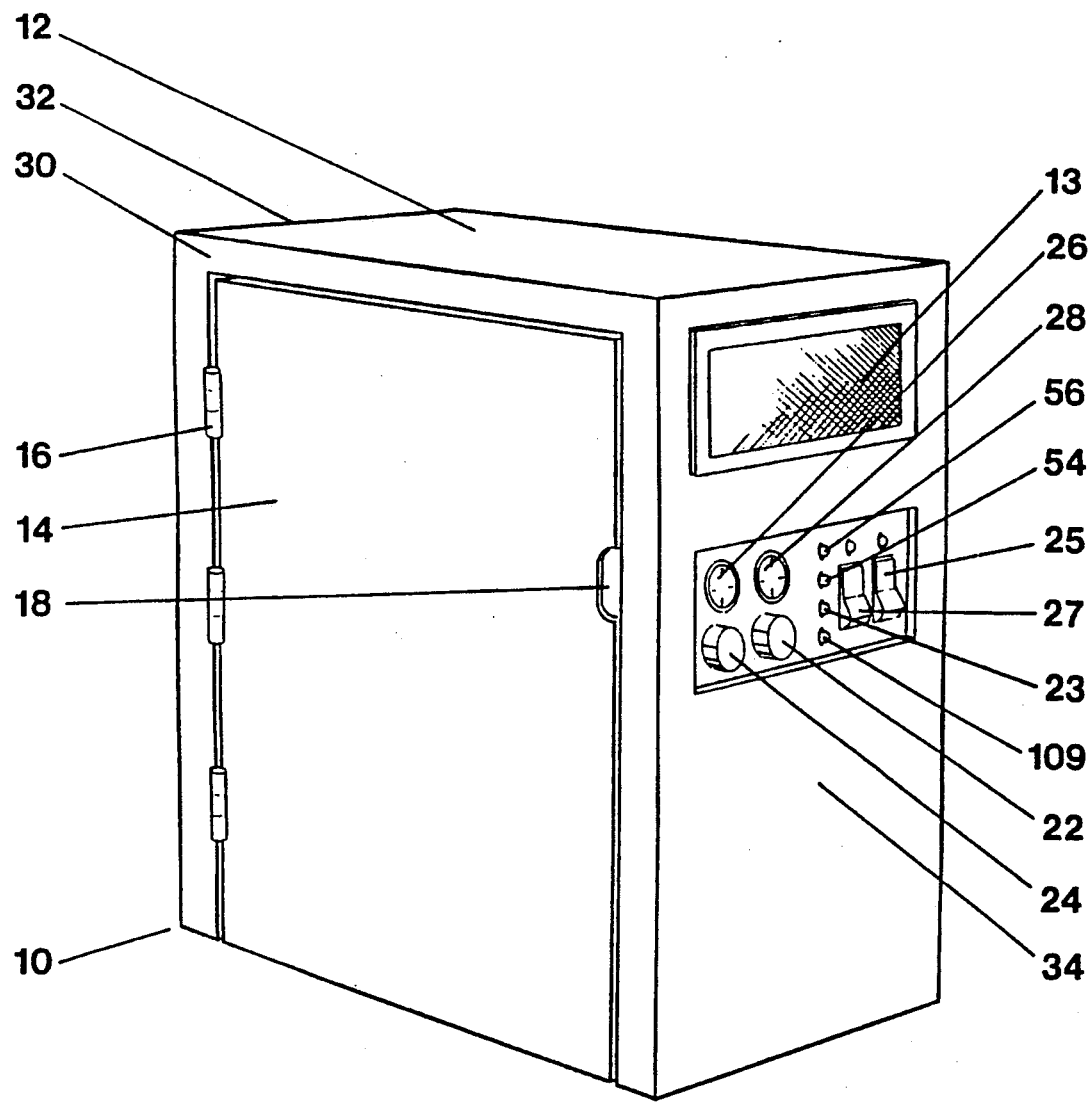
FIG. 1 is a schematic front view of the invention.

The basic device 10 as shown in FIG. 1 is enclosed in a cabinet 12 which houses the entire apparatus except for certain ductwork on some models which needs to be external of the device as explained below. The cabinet 12 has an insect screen 13, a side door 14 which is hinged at 16 and has a handle 18 with which this door can be opened to provide access to the inside of the device including the water filter element, air filter, UV lights, and the water container and/or temporary reservoir as well as all other serviceable parts.

Figure 5:
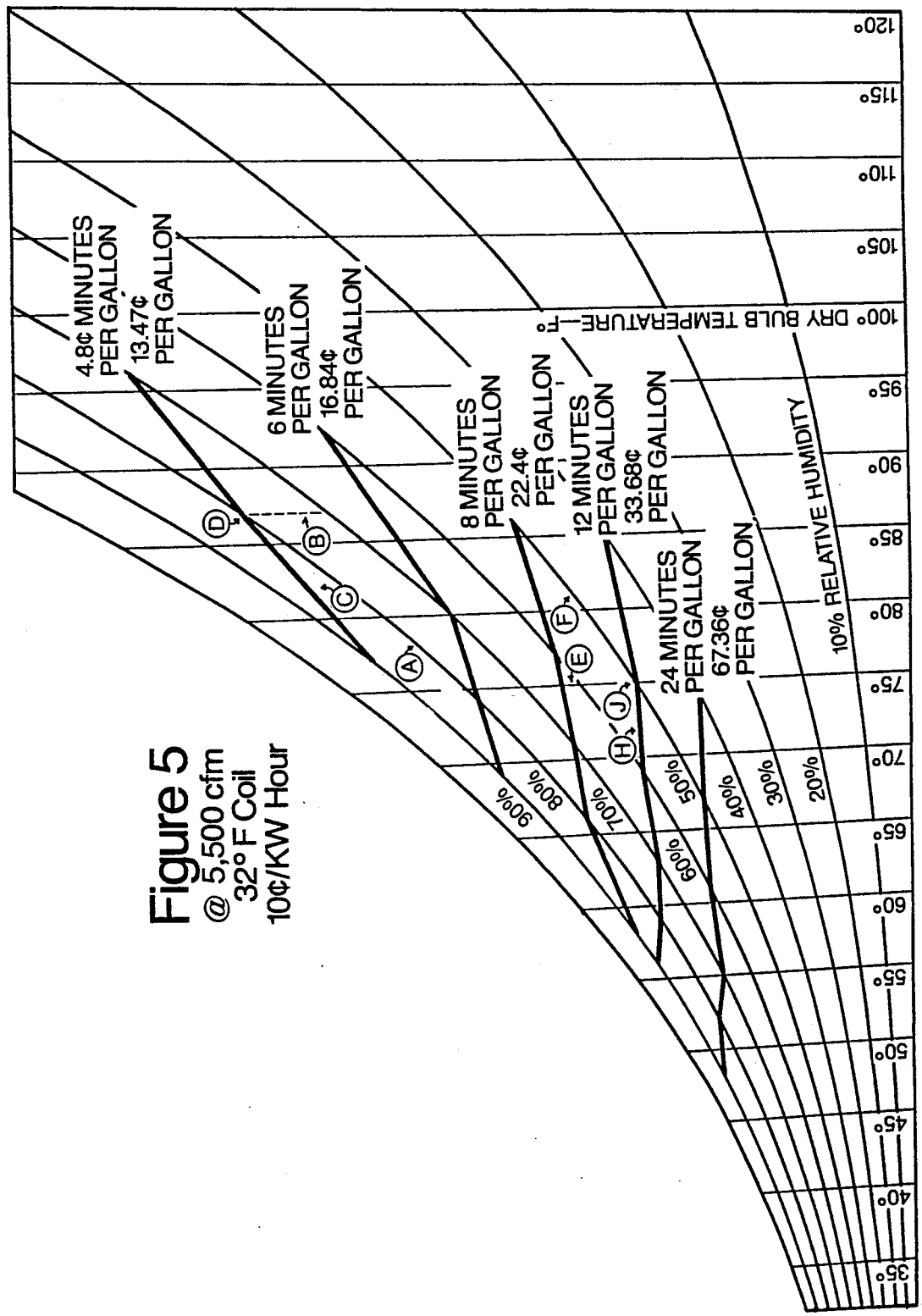
FIG. 5 is a chart of temperature and humidity on a scale which includes the approximate time and cost of producing a gallon of water using an arbitrary electrical cost of 10¢ per KWH.

There are two settable, optional, switches 22 and 24 which are a thermostat 22 to measure the temperature and open or close when a predetermined temperature is attained, and a humidistat 24 to measure the humidity and open or close when a predetermined humidity is attained. Complementing the switches there are two optional gauges 26 and 28 which are temperature and humidity gauges, respectively, for user-preferred manual on/off operations, and which are an aid to determine the immediate water yields in conjunction with an optional simplified quick reference chart supplied with this device. (A more complex chart is shown in FIG. 5.) Switch 25 is the master ON/OFF switch that allows optional settable switches 22 and 24 to automatically activate or deactivate the basic device 10. Switch 27, if used, is a manual switch, and would override the conditional settings of optional switches 22 and 24.

Figure 2:
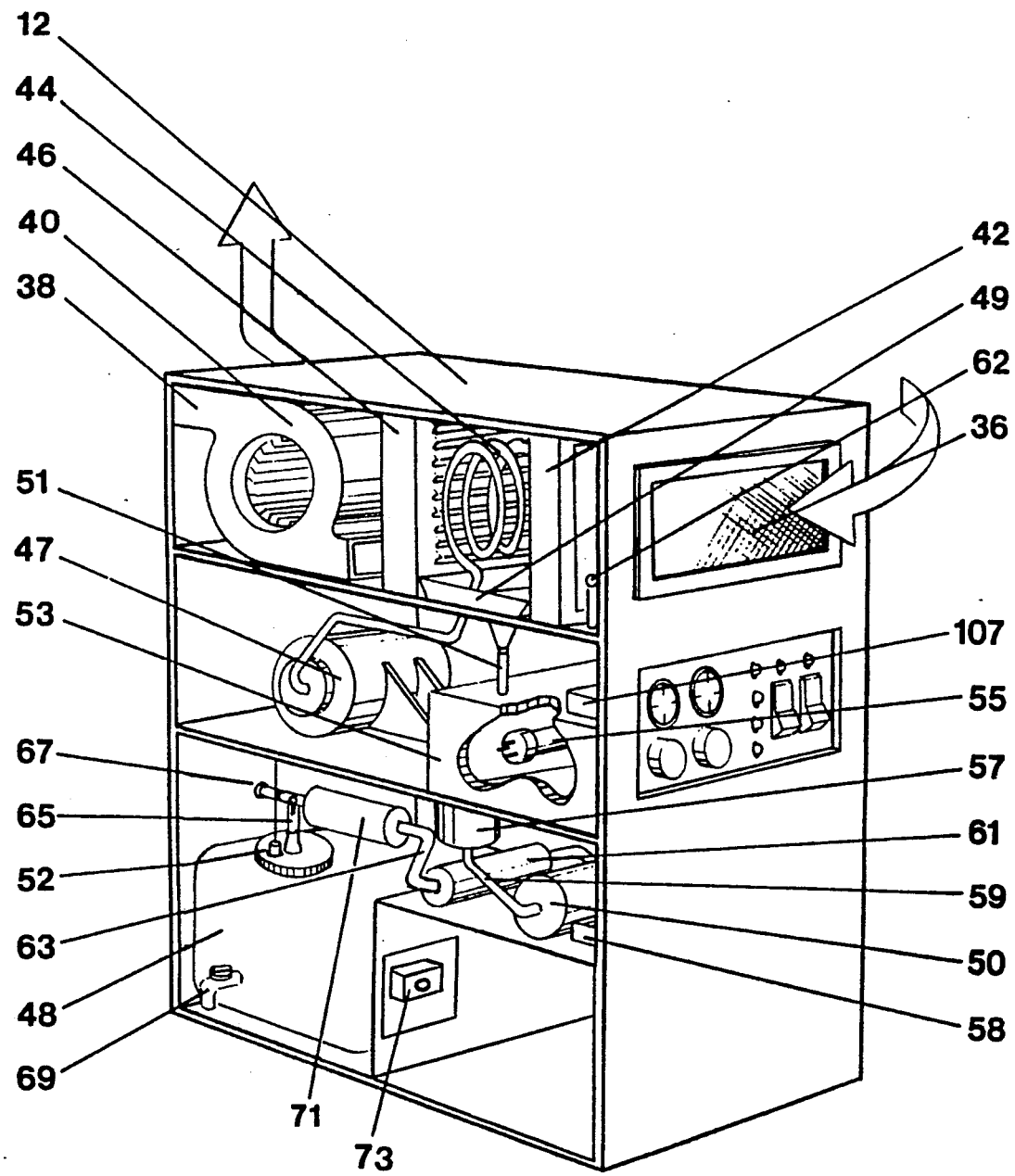
FIG. 2 is an isometric view of the device with parts broken away for clarity.

More details of the device are visible in FIG. 2, in which portions of the cabinet 12 walls have been broken away for clarity. The cabinet 12 has a side wall 30, a rear wall 32, and front wall 34. An inlet duct 36 and an outlet duct 38 are provided to direct ambient air through the device by means of the ductwork inside the cabinet. This ductwork can be located through an outside wall in some models. In addition to the model illustrated herein, which can vary in size, there can also be countertop models which fit into the kitchen cabinetry and which may have side venting arrangements. Still more variations can be constructed to fit recreational vehicles, mobile homes, and boats of all sizes as well as military and disaster relief applications. There is a fan or blower 40 which assists in bringing ambient air into the device. The air first passes through an air filter element 42 and then through the evaporator coils 44 of condenser coils 46, aided by compressor 47 to cool the air sufficiently to remove water vapor by condensation.

The water condensate falls onto a collection pan 49 which immediately diverts this water into tube or piping 51 which empties into a temporary holding reservoir 53, which contains an ultraviolet light 55 to kill 99.99% of any existing microorganisms. This UV light could also be positioned in a coiled or extended arrangement of piping 51. This temporary holding reservoir 53 could be positioned to replace the collection pan 49. When the water level in reservoir 53 reaches a specific level, pump 57 will force this water through tubing or piping 59, continuing through water filter 50, piping 59, and past a second ultraviolet light 61. This second ultraviolet light will kill 99.99% of any surviving microorganisms that may have reached this point. The machine could be made to shut down if either light failed to operate properly. It is also possible with a different piping arrangement to pass the water by ultraviolet light 55 a second time, thereby eliminating the need for two individual ultraviolet lights. The water will continue travelling from ultraviolet light 61 into piping arrangement 63 which may include a diverting valve 65 to direct the water into either the removable internal container 48, or through common fitting 67 which would be used to connect to other exterior containers or tanks. A final ultraviolet light 71 may be positioned as close as possible to the final exiting point(s) of the water to act as a sterile outlet in order to avoid the introduction of microorganisms into the unit's system at this point. The removable container 48 can be designed to be reusable, safely, by having a wide neck opening for easy cleaning. It can also have an optional spigot 69. There is also a liquid level sensor device 52 that is positioned inside the container and below the top, for shutting the machine down when the container 48 is full, to prevent overflowing.

A light 54 (FIG. 1) could turn on or flash whenever the water filter is in need of being changed. There could be another light 56 (FIG. 1) which would turn on whenever the air filter is in need of being changed or cleaned. A third light 23 (FIG. 1) could indicate that the internal, removable reservoir is full, and a fourth light 109 (FIG. 1) could indicate if one of the ultraviolet light(s) is out. A fifth and sixth light could be added to individually indicate non-functioning status of a second and third ultraviolet light, if applicable and so desired. Each indicator light could, individually, be programmed to deactivate the entire unit, or just the water condensing function as it may be preferred to allow continued operation of other functions. A separate time or flow meter 58 may be set to deactivate the unit until the non-reusable water filter is replaced after a predetermined number of hours of operation or water volume passage. A second separate sensor device 62 may be used which deactivates the unit until the non-reusable air filter is replaced or a reusable air filter is cleaned after a predetermined pressure drop from one side of the air filter to the other, and which increases with time. Thus, the air filter, for example, can be arranged with a device 62 for measuring the air pressure both upstream and downstream of the air filter and when the differential reaches a predetermined point, the device will indicate the need for cleaning or shut down until the air filter is replaced or cleaned. This is based upon the air flow downstream decreasing as the filter becomes more filled with filtered material, causing the machine to become less efficient. Device 62 thereby prevents needless waste of energy. A light sensor, or lighting drive voltage or current sensor 107, and similar sensors for lights 61 and 71, in conjunction with an indicator such as part 109, FIG. 1, could sense and indicate when a light has burned out, and may be enabled to automatically stop the unit from operating as a safety measure.

Figure 3:
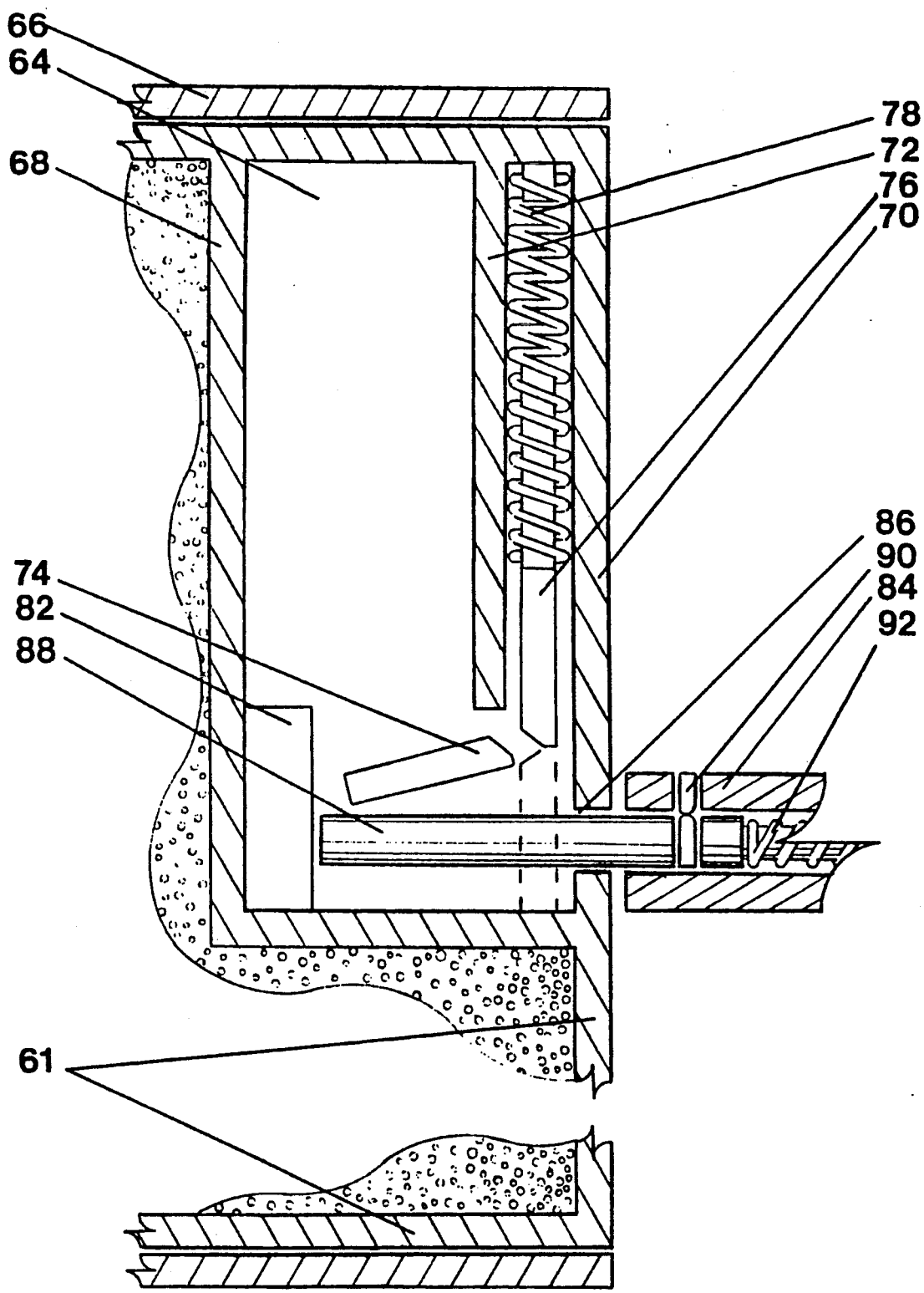
FIG. 3 is a plan view of a cooperating female sensor which can be integrated into the filter frames to confirm that the proper filter is in place, and allow only one-time use when the filter is not intended to be reusable.

As shown in FIG. 3 in plan view, the air or water filter 42 or 50 is held in a frame or housing. Each frame may have a one-time use cooperating female sensor 64 built into it. This sensor may be modified by eliminating trap door 74/76 and compression spring 78 to allow repeated use of a reusable, cleanable air filter. It will continue to sense that the proper, reusable air filter is in place. This female sensor 64 is positioned in a special place within the air filter frame or water filter housing 61, which in turn is held in position by guiding channels 66. The female sensor 64 is provided with a basic chassis 68 having a back wall 70, and a retaining wall 72 spaced slightly therefrom and providing sufficient space for holding a "trap door" arrangement including two pieces 74 and 76 weakly connected together along line 80 (FIG. 4), and located in the space between the back wall 70 and the retaining wall 72. The trap door 74, 76 is biased downwardly by compression spring 78.

The female sensor 64 has a stop block 82 on the wall opposite the one containing the trap door opening 86. There is a frame 84 on the generator which slidably holds a switch activating pin 88 which is biased toward the filter by compression spring 92. There is an electrical switch contact 90 which is closed when the off/on/off travel of pin 88 is in a certain location within the switch frame 84 held in precise horizontal position by spring 92 holding it against stop block 82. The trap door has a lower part 74 which breaks or bends away when pin 88 is inserted into chassis 68 through opening 86, and an upper part 76 which is held in its original position by pin 88 until the filter with attached female sensor 64 is removed. Then, compression spring 78 forces part 76 down and holds it there, sealing opening 86, preventing further use of this filter. The primary intent, then, of this female sensor 64 would be to prevent the user from reusing an expended water filter or air filter once it is removed from the machine and/or to confirm that the proper reusable air filter is in place. Device 62 (FIG. 2) senses when the air filter becomes inefficient and may shut the machine off until only a new or cleaned air filter is reinstalled. Device 58 (FIG. 2) determines by a specific time period or water flow volume when the water filter should be removed and replaced with a new water filter, and may be enabled to prevent further operation of the machine or just its condensing function, until this is done. Because female sensor 64 can prevent the reuse of either expended filter it would thereby assure only safe and energy efficient use of this machine.

In some cases it may be desirable to have an air filter that can be cleaned and reused. In these instances a different air filter, such as an electrostatic filter, intended for repeated use can be used and female sensor 64 would lack compression spring 78 and trap door 74/76. Stop block 82 would then work in conjunction with opening 86 and pin 88 to confirm that only the proper air filter is in place. Energy conservation would still be monitored by device 62.

Figure 4:
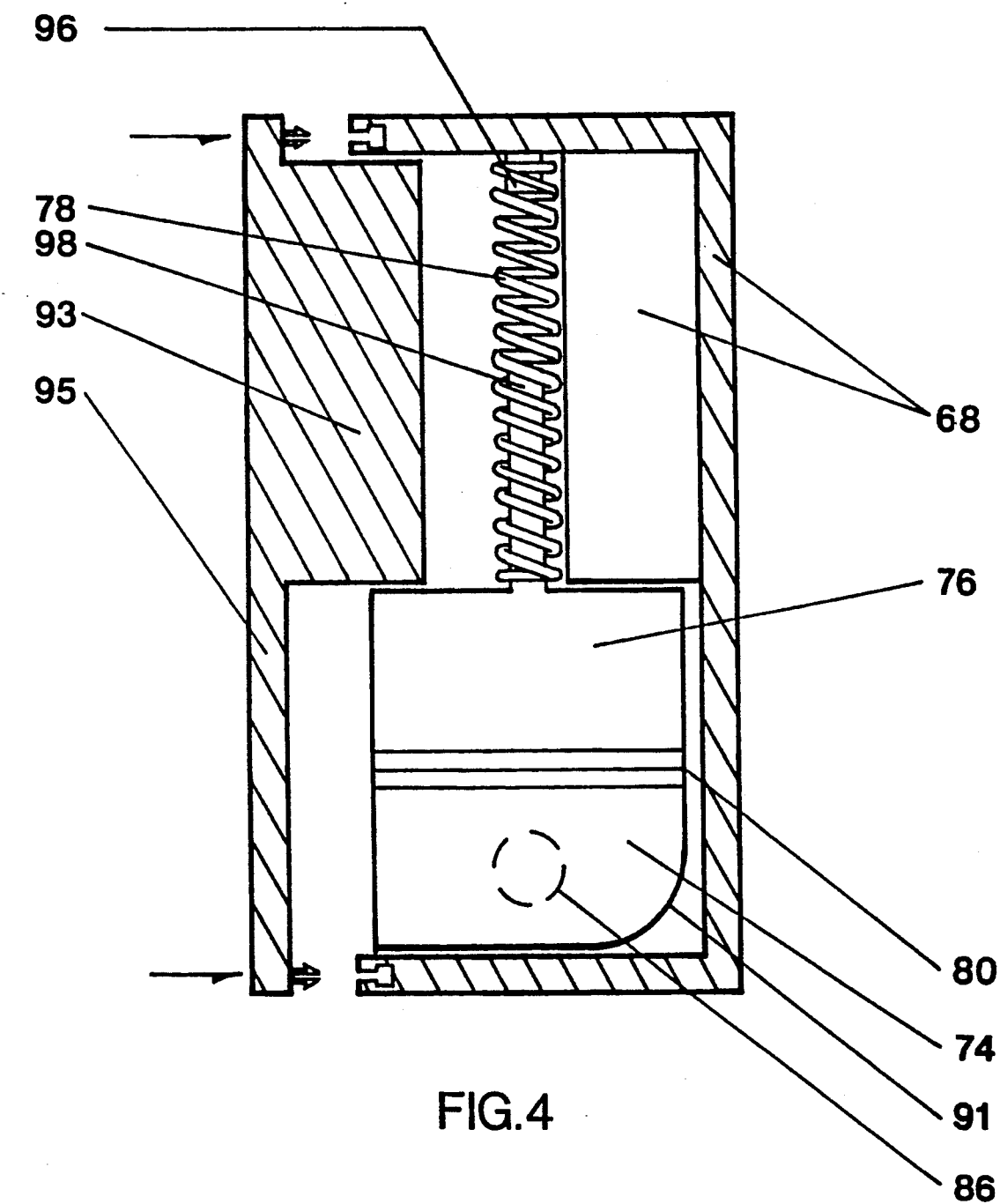
FIG. 4 is a front view of the cooperating female sensor illustrated in FIG. 3.

FIG. 4 shows the one-time use cooperating female sensor from the front (less wall 70 for clarity). The sensor basic chassis 68 is shown, as is the compressed spring 78. There may be a nipple 96 or other guiding parts which would hold the spring 78 when it is uncompressed in position during assembly, and the nipple is attached to the chassis. There is another longer nipple 98 attached to part 76 at the bottom end of the spring 78 which holds this spring while it is being compressed by the insertion of the trap door. There is a top piece 95 (shown in FIG. 4 as a side view) which permanently seals the entire chassis. The final assembly piece 95 of the entire device, is shown partially inserted. There is a retaining block 93 which is also part of assembly piece 95 and aids in holding the upper part of the trap door in position while open or closed, including spring 78. The interior of the trap door is "chiselled" or weakened at point 80 to create a breaking or bending point. The bottom end of the trap door may have a modified corner 91 to allow insertion of the trap door while compressing the spring 78 from an angled starting position.

When the filter is entered into its correct position the pin or male sensor 88 which projects out of its switch frame 84 engages the trap door through an opening 86 in the rear wall 70. The unit will only operate when pin 88 is in its precise, but only partially extended, off/on/-off travel position as precisely determined by block 82. Also, upon pressing of the filter into place, the trap door bends or breaks and the shorter part 74 falls away or bends clear of pin 88's continued travel to stop block 82 and upper part 76 slides down due to pressure from compression spring 78 and remains resting upon the top of the pin 88. When it is time to remove the filter, it is removed and the compression spring 78 forces part 76 downward until it reaches the bottom, and it thereafter remains in this position. It is impossible to place this same filter into this same location because the outwardly extending pin 88 will not go beyond wall 70, as it will be blocked by the trap door upper part 76. Thus, the filter cannot be reused. When the filter is first placed into position, the pin 88 breaks the trap door, and the lower part of it, which is at first in a vertical position as shown in dashed lines, moves into and through the solid line position of the part and it then falls down or bends clear of pin 88 where it thereafter remains.

All the aforementioned features, if utilized, can be monitored by an optional programmed computer chip 73, and in addition to illuminating the appropriate indicator light, can, on an individual basis, deactivate the entire unit, or just the condensing function, until the respective malfunction is appropriately rectified. This would make the unit failsafe as it would be partially or totally deactivated if any one of the following optional or necessary features occurred: 1) the air filter became dirty, 2) the air filter was not properly in place, 3) the water filter's predetermined life had expired, 4) the water filter was not replaced and installed in correct position, 5) one, or more, of the ultraviolet lights failed, 6) the final water reservoir tank was full.

FIG. 5 provides a chart showing various ambient conditions and has added thereto the approximate number of minutes to produce one gallon of water at the temperature and relative humidity conditions indicated for a specific coil temperature and rate of air flow. Also, the approximate cost of energy to make a gallon of water is calculated at an assumed cost of 10¢/KWH. (The current national average is 8¢/kwh). Thus, if the humidistat was set for 80% relative humidity, which is the curve designated A in FIG. 5, and the thermostat was set for 87° F. (which is the vertical dashed line designated B), the device would produce a gallon of water in 4.8 minutes and at a cost of less than 13.5¢/gallon as shown on line C at point D in FIG. 5. A second example in FIG. 5 shows vertical line E indicating a thermostat setting at 75° F. and curved line F indicating a humidistat relative humidity setting of 50%, which results in the production of a gallon of water in approximately 12 minutes as designated on line H at point J at an approximate cost of 34¢ per gallon. The settings of the humidistat and thermostat assure that the device will operate only when the ambient air meets or exceeds the conditions set, and at a cost and time period acceptable to the user.

Figure 6:
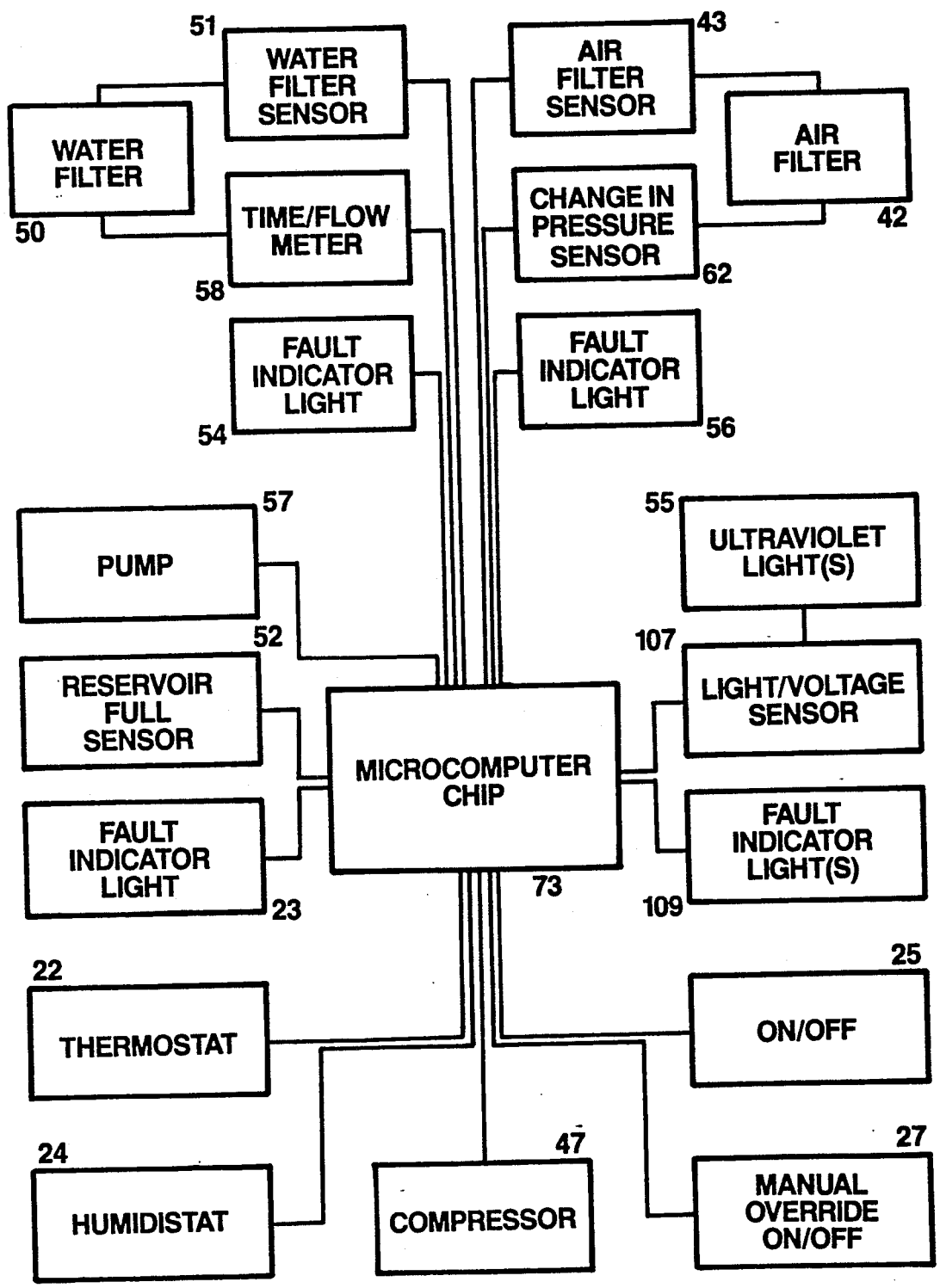
FIG. 6 is a block diagram of an electronics/sensing/control system for the device of this invention.

FIG. 6 details electronics/sensing/control system 103 for the potable air-water generator of this invention. Microcomputer chip 73 monitors each of the sensors in the device that indicate a fault with the device and in response can be programmed to shut down the entire device or compressor 47 so that water is not generated during a fault condition. Alternatively, the fault could merely be signalled to warn the operator that the system is operating in a compromised condition. Power on/off switch 25 powers the entire system 103. Thermostat 22 and humidistat 24, which may be overridden by manual override switch 27, operate as described above. Air filter 42 is monitored by pressure sensor 62 that monitors the pressure drop across the filter for indicating when the filter is dirty and, when a predetermined pressure drop is reached, for lighting fault indicator light 56 and notifying microcomputer 73 of the fault so that the appropriate action can be taken. Likewise, air filter sensor 43 (such as switch 90, FIG. 3) for sensing when the air filter is properly in place indicates a fault by lighting light 56 and notifying microcomputer 73. In a similar fashion, time/water flow meter 58 monitors the operation of water filter 50 to light fault indicator light 54 and notify microcomputer 73 when the device has been in operation for a predetermined period of time and/or a predetermined volume of water has flowed through the filter 50. Water filter sensor 51 (such as switch 90, FIG. 3) senses when the water filter is in place, and indicates by lighting indicator light 54 and notifying microcomputer 73 when a clean filter is not in place. In a similar fashion, light or voltage sensor 107 monitors the operation of ultraviolet light 55 and, when the light goes out, lights fault indicator light 109 and notifies microcomputer 73 so that the appropriate action can be taken. Preferably, when the air filter is dirty, the water filter has been used for the predetermined amount of time or for a predetermined water flow, and any one of the ultraviolet lights is not lit, microcomputer 73 is enabled to turn off compressor 47 but may leave the rest of the system running so that the system will not produce water when in less than satisfactory operating condition to provide only clean, pure water at a reasonable cost.

Although specific features of the invention are shown in some drawings and not others, this is for convenience only as each feature may be combined with any or all of the other features in accordance with the invention.

Other embodiments will occur to those skilled in the art and are within the following claims:

What is claimed is:

1. A water generating device for obtaining potable water from ambient air, comprising:
    means for bringing a supply of inside or outside ambient air to the device and for returning the air back outside the device after it has been processed;
    air filtering means for filtering the air;
    condenser means for extracting water vapor from the filtered air;
    first ultraviolet light means for killing microorganisms in the extracted water;
    a temporary holding reservoir for holding the freshly extracted water;
    pump means for moving the water from the temporary holding reservoir to a subsequent location within the device, or to a subsequent location exterior to the device;
    water filter means downstream of said pump means for filtering the water; and
    outlet means for allowing filtered water to exit the device.

2. The water generating device of claim 1, further including means for sensing the pressure differential across the air filter.

3. The water generating device of claim 2 further including means, responsive to said means for sensing, for deactivating said condenser means after a predetermined pressure differential is reached.

4. The water generating device of claim 2 further including means, responsive to said means for sensing, for signalling when a predetermined pressure differential is reached.

5. The water generating device of claim 1, further including means for determining time of use of said device.

6. The water generating device of claim 5 further including means, responsive to said means for determining, for deactivating at least said condenser means after a predetermined time of use.

7. The water generating device of claim 5 further including means, responsive to said means for determining, for signalling when a predetermined number of hours of operation has been reached.

8. The water generating device of claim 1 further including means for determining the extracted water flow volume.

9. The water generating device of claim 8 further including means, responsive to said means for determining, for deactivating at least said condenser means after a predetermined water volume has been sensed.

10. The water generating device of claim 8 further including means, responsive to said means for determining, for signalling when a predetermined water volume has been sensed.

11. The water generating device of claim 1 further including means for exposing the water to ultraviolet light a second time downstream of said water filter means to kill additional microorganisms.

12. The water generating device of claim 11 in which said means for exposing includes a second ultraviolet light.

13. The water generating device of claim 11 in which said means for exposing includes means for running the pumped water past said ultraviolet light means.

14. The water generating device of claim 11 in which said means for exposing includes an ultraviolet light proximate the outlet means for preventing microorganisms from entering the device through the outlet means.

15. The water generating device of claim 11 in which said means for exposing includes a second exposure to said ultraviolet light means.

16. The water generating device of claim 1 in which said air filtering means includes a reusable filter.

17. The water generating device of claim 16 in which said air filter is an electrostatic filter.

18. The water generating device of claim 1 further including means for monitoring said ultraviolet light means for determining when said ultraviolet light means is not activated.

19. The water generating device of claim 18 further including means, responsive to said means for monitoring, for signalling when said ultraviolet light is not activated.

20. The water generating device of claim 18 further including means, responsive to said means for monitoring, for deactivating the device when said ultraviolet light is not activated.

21. The water generating device of claim 1 further including thermostat means and humidistat means which are settable in conjunction with each other by a user to minimize energy consumption and maximize water yield.

22. The water generating device of claim 1 further including a thermometer and humidity indicator for manual use of the device.

23. The water generating device of claim 1 further including means for permitting use of the water filter only one time so that the water filter is not reusable after removal.

24. The water generating device of claim 1 further including means for sensing when said air filtering means is not properly in place in said device.

25. The water generating device of claim 24 further including means, responsive to said means for sensing, for indicating when said air filtering means is not properly in place.

26. The water generating device of claim 24 further including means, responsive to said means for sensing, for deactivating at least said condenser means when said air filtering means is not properly in place.

27. The water generating device of claim 1 further including means for sensing when said water filter means is not properly in place in said device.

28. The water generating device of claim 27 further including means, responsive to said means for sensing, for indicating when said water filter means is not properly in place.

29. The water generating device of claim 27 further including means, responsive to said means for sensing for deactivating at least said condenser means when said water filter means is not properly in place.

30. The water generating device of claim 1 further including means for deactivating at least said condenser means when said air filtering means is not in place or is dirty, said ultraviolet light means is not on, or said water filter means is not in place or has been used for a predetermined time or to filter a predetermined volume of water.

31. A water generating device for obtaining potable water from ambient air inside a structure or dwelling or ambient air outside a structure or dwelling, comprising:

air passage means for bringing a supply of inside or outside ambient air to the device and for returning the air back outside the device after it has been processed;

reusable, electrostatic air filter means for filtering the air prior to processing of the air;

means for sensing and indicating when said air filter is dirty or not properly in place;

condenser means for extracting water vapor in the filtered air;

blower means inside the air passage means to move air from outside the device through the air filter and the condenser means and for returning the air back outside the device after it has traversed the condenser means;

first ultraviolet light exposure means for killing microorganisms in the extracted water vapor;

temporary holding reservoir means for containing said extracted water vapor;

pump means to move the water from the temporary holding reservoir to a subsequent location within or outside of the device;

single-use water filter means downstream of said pump means for filtering the water, said water filter means including a cooperating sensor which renders the water filter non-reusable in the device once removed;

second ultraviolet light exposure means to act as a sterile outlet preventing microorganisms from migrating backwards into the system; and means for measuring the pressure differential across the air filter for indicating when a predetermined pressure drop across the filter is reached.

* * * * *